United States Patent [19]

Takefuta et al.

[11] Patent Number: 4,662,491
[45] Date of Patent: May 5, 1987

[54] APPARATUS FOR CONTROLLING A CLUTCH FOR VEHICLES

[75] Inventors: Hideyasu Takefuta; Tatsuya Seshima, both of Higashimatsuyama, Japan

[73] Assignee: Diesel Kiki Co., Ltd., Japan

[21] Appl. No.: 731,081

[22] Filed: May 6, 1985

[30] Foreign Application Priority Data

May 4, 1984 [JP] Japan .................................. 59-88473

[51] Int. Cl.$^4$ ........................ F16D 43/22; B60K 41/02
[52] U.S. Cl. .............................. 192/0.032; 192/0.052; 192/0.076; 192/0.077; 192/0.084
[58] Field of Search ............... 192/0.032, 0.052, 0.075, 192/0.076, 0.077, 0.084, 0.092, 0.096; 364/426

[56] References Cited

U.S. PATENT DOCUMENTS

| | | | |
|---|---|---|---|
| 4,083,443 | 4/1978 | Hamada et al. | 192/0.075 X |
| 4,428,467 | 1/1984 | Hiramatsu | 192/0.076 X |
| 4,509,625 | 4/1985 | Tellert | 192/0.052 X |
| 4,548,079 | 10/1985 | Klatt | 364/426 X |
| 4,550,816 | 11/1985 | Sakakiyama | 192/0.092 X |

FOREIGN PATENT DOCUMENTS

| | | | |
|---|---|---|---|
| 0033225 | 3/1977 | Japan | 192/0.076 |
| 0103063 | 6/1984 | Japan | 192/0.032 |

Primary Examiner—Rodney H. Bonck
Attorney, Agent, or Firm—Guy W. Shoup

[57] ABSTRACT

In a vehicle clutch control apparatus having an actuator for operating a friction clutch and a controller for controlling the actuator, whereby a first data representing a semi-engaging zone is obtained by the controller just after the engine is started and the vehicle is driven to move, the apparatus has a data generator for producing a second data relating to the magnitude of the load of the vehicle and a unit for correcting the first data in accordance with the second data. As a result, data representing the actual semi-engaging zone of the clutch depending upon the load conditions of the vehicle at that time can be obtained, so that it becomes possible to realize an appropriate semi-engaging operation even when the load of the vehicle has changed.

9 Claims, 6 Drawing Figures

APPARATUS FOR CONTROLLING A CLUTCH FOR VEHICLES

BACKGROUND OF THE INVENTION

The present invention relates to a clutch controlling apparatus for vehicles in which the semi-engaging zone of a friction clutch is detected at appropriate intervals and the engaging operation of the friction clutch is automatically carried out on the basis of the detected result.

In the prior art, there have been proposed various apparatuses by which the operation of the friction clutch of a vehicle can be automatically carried out by means of a hydraulic actuator with a solenoid valve. Such conventional apparatuses are constituted in such a way that the semi-engaging zone of the friction clutch is detected by the execution of a predetermined learning operation just after the engine is started and before the vehicle is driven to move the automatic engaging operation of the friction clutch is carried out in accordance with a predetermined control program with reference to data concerning the detected semi-engaging zone. That is, in the conventional apparatus, the learning operation for detecting the semi-engaging zone is usually carried out just after starting of the engine, and the resulting data is thereafter used every time automatic engagement of the clutch is carried out.

However, in such a clutch, the degree of semi-engagement required for the operation of putting the vehicle into motion (hereinafter sometimes called the vehicle starting operation) is determined in accordance with the load condition of the vehicle Consequently, on a flat surface learning data for the semi-engaging zone of the clutch obtained during vehicle starting at a flat place may later be used during starting on an uphill slope. In this case, even when the gear position of the transmission and the semi-engaging condition of the clutch are set according to the automatic control system, the clutch will slip unless the operating pattern of the clutch for starting the vehicle is changed. Thus, smooth starting cannot be realized and there is a possibility that the vehicle will move backward. Furthermore, there is the disadvantage that the clutch disc will wear rapidly, shortening the service life of the clutch. These disadvantages will also arise when the load weight of the vehicle is changed.

SUMMARY OF THE INVENTION

It is an object of the present invention to provide an improved vehicle clutch control apparatus in which the semi-engaging zone of a friction clutch for a vehicle is detected by a learning operation and the engaging operation of the friction clutch is automatically carried out on the basis of the detected result.

It is another object of the present invention to provide a vehicle clutch control apparatus which is capable of smoothly starting the vehicle regardless of any change in the vehicle load condition.

It is a further object of the present invention to provide a vehicle clutch control apparatus which is capable of smoothly starting the vehicle even on a slope.

According to the present invention, in a vehicle clutch control apparatus having an actuator for operating a friction clutch for a vehicle and a controlling means for controlling the actuator, whereby a first data representing a semi-engaging zone in which the clutch is in a semi-engaged state is obtained in response to a command from the controlling means just after the engine is started and before the vehicle is driven to move, and at least the engaging operation of the clutch is carried out with reference to the first data, the apparatus comprises means for producing a second data relating to the magnitude of the load of the vehicle and means for correcting the first data in accordance with the second data.

The second data indicates the magnitude of the load of the vehicle on the engine of the vehicle. Therefore, the second data may be data relating to the weight of the vehicle load and/or to the inclination of the surface on which the vehicle is resting.

With this structure, the first data obtained in advance is corrected in accordance with the second data, and data representing the actual semi-engaging zone of the clutch depending upon the load conditions of the vehicle at that time can be obtained. As a result, it becomes possible to realize an appropriate semi-engaging operation even when the load of the vehicle has changed, so that the smooth starting of the vehicle is assured for all vehicle load conditions.

The invention will be better understood and the other objects and advantages thereof will be more apparent from the following detailed description of a preferred embodiment with reference to the accompanying drawings.

DESCRIPTION OF THE PREFERRED EMBODIMENTS

Figure 1:
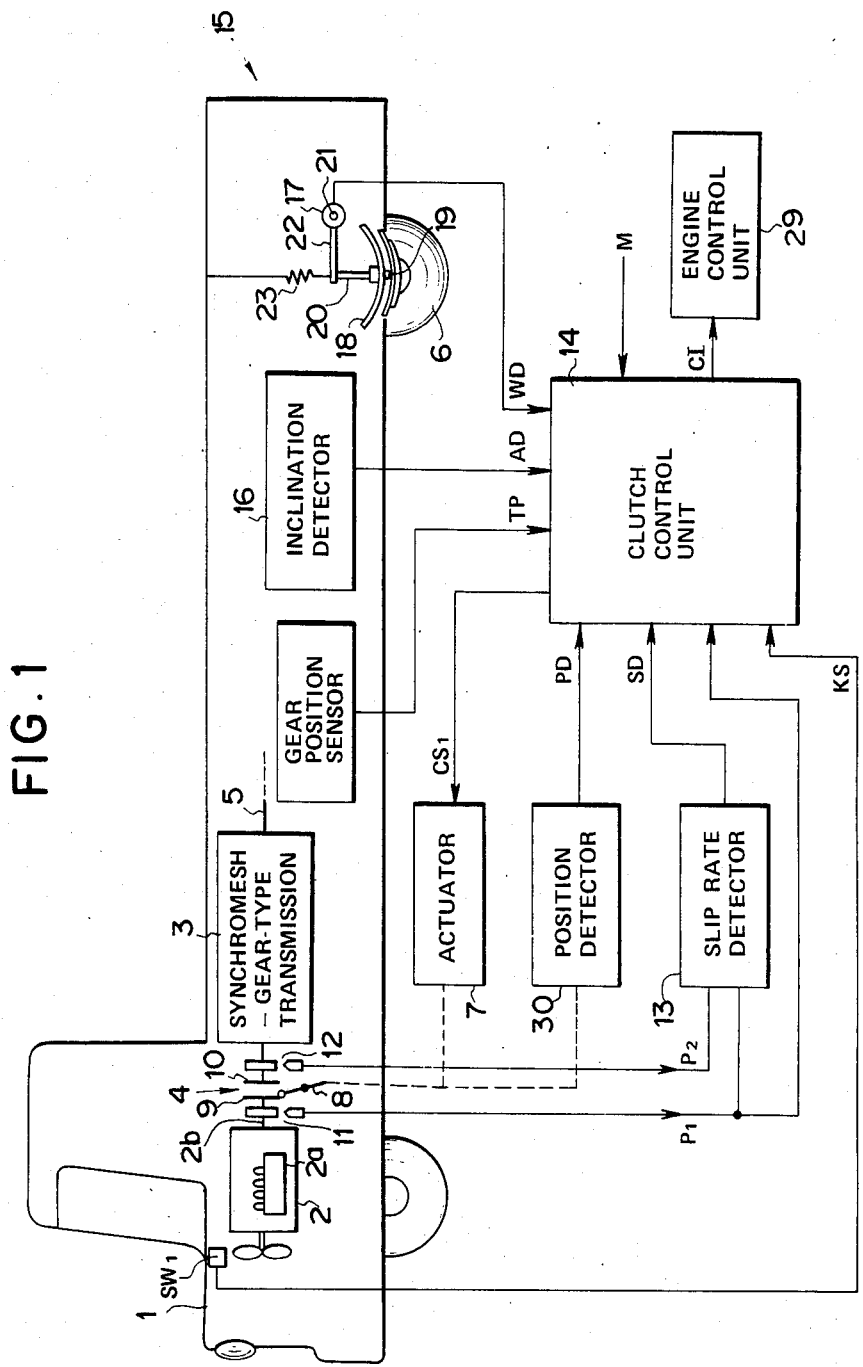
FIG. 1 is a block diagram of the control system of a truck employing an embodiment of a vehicle clutch control apparatus of the present invention.

FIG. 1 shows an embodiment of a vehicle clutch control apparatus of the present invention as applied to a truck. On the vehicle body 1 of the truck are mounted a diesel engine device 2 including a fuel injection pump $2_a$ and a synchromesh-gear-type transmission 3. The rotational output from the output shaft $2_b$ of the diesel engine device 2 is transferred through a friction clutch 4 to the transmission 3 and the rotational output from the transmission 3 is transferred through a propeller shaft 5 to rear wheels 6.

The friction clutch 4 has a release-lever 8, a driving disc 9 operatively connected with the release-lever 8 and an output disc 10 associated with the driving disc 9, and an actuator 7 for carrying out the engaging/disengaging operation of the friction clutch 4 is connected with the release-lever 8. When the release-lever 8 is operated by the actuator 7 in response to a control signal $CS_1$, which will be explained below, the position of the driving disc 9 is controlled and the engaging condition between the driving disc 9 and the output disc 10 of the friction clutch 4 is adjusted to engage/disengage the friction clutch 4.

For detecting the slip rate of the friction clutch 4, there are provided a first speed sensor 11 on the side of the driving disc 9 and a second speed sensor 12 on the side of the output disc 10, and a first pulse train signal $P_1$ relating to the rotational speed of the driving disc 9 and a second pulse train signal $P_2$ relating to the rotational speed of the output disc 10 are produced from the first and second speed sensors 11 and 12, respectively. The first and second pulse train signals $P_1$ and $P_2$ are applied to a slip rate detector 13 which calculates the slip rate of the friction clutch 4 on the basis of the first and second pulse train signals $P_1$ and $P_2$ and forwards a slip signal SD indicating the calculated result to a clutch control unit 14.

The release-lever 8 is also connected with a position detector 30 and a signal relating to the amount of operation of the release-lever 8 is produced therefrom as a position signal PD. As will be understood from the foregoing description, the position signal PD corresponds to the position of the driving disc 9 relative to the output disc 10, and is applied to the clutch control unit 14.

Furthermore, for detecting the magnitude of the load applied to the vehicle or the diesel engine device 2, there are mounted on the vehicle body 1 a load weight detector 15 and an inclination detector 16 for detecting the inclination of the surface on which the truck rests. The load weight detector 15 has a potentiometer 17 secured on the frame (not shown) of the vehicle body 1 and a push-rod 20 perpendicularly fixed on an axle 19 for the rear wheels 6 which is supported by a chassis spring 18. The rotating shaft 21 of the potentiometer 17 is connected through a link 22 with the top end of the push rod 20 and the link 22 is maintained in pressure contact with the top end of the push rod 20 by a spring 23. Consequently, when the weight of the load of the truck increases from the state shown in FIG. 1, the chassis spring 18 is bent, so that the push rod 20 rotates the link 22 to change the resistance value of the potentiometer 17. As a result, a signal whose level varies in accordance with the bending state of the chassis spring 18, that is, with the weight of the load, is produced from the potentiometer 17 as a weight signal WD, which is applied to the clutch control unit 14.

Figure 2:
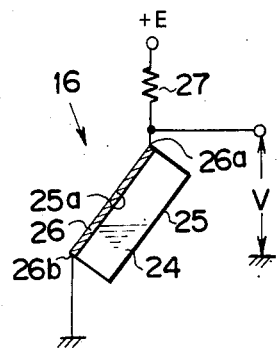
FIG. 2 is a view showing the structure of the inclination detector of FIG. 1.

As shown in FIG. 2, the inclination detector 16 has a container 25 in which mercury 24 is sealed and a resistor plate 26 is attached on one inner side wall $25_a$ of the container 25. One end $26_a$ of the resistor plate 26 is connected through a fixed resistor 27 to a d.c. voltage source $+E$ and the other end $26_b$ of the resistor plate 26 is grounded. The container 25 is fixed at an appropriate place on the vehicle body 1 so as to assume the attitude shown in FIG. 2 when the truck is on a flat surface. Therefore, the contacting area of the resistor plate 26 with the mercury 24 varies in accordance with the inclination of the vehicle body 1 and the resistance value between the opposite ends of the resistor plate 26 varies accordingly.

Consequently, when the truck is on a slope, the level of the voltage signal V developed across the resistor plate 26 is proportional to the inclination of the slope. The voltage signal V is applied to the clutch control unit 14 as an inclination signal AD.

Defining the weight of the vehicle as W, the vehicle speed as v, and the inclination of the vehicle as $\theta$, the load L of the vehicle can be expressed as $$L = \alpha W + \beta v^2 + \gamma W \sin \theta$$

where $\alpha$, $\beta$ and $\gamma$ are coefficients.

The load of the vehicle at each instant is calculated in the clutch control unit 14 on the basis of the above mentioned equation in accordance with the signals AD and WD.

The clutch control unit 14 receives the first pulse train signal $P_1$ from the first speed sensor 11, a switch signal KS showing the position of an ignition switch $SW_1$, and a gear position signal TP showing the gear position of the transmission 3 from a gear position sensor 28. Information CI concerning the clutch control is supplied from the clutch control unit 14 to an engine control unit 29 for controlling the operation of the diesel engine device 2.

Figure 3:
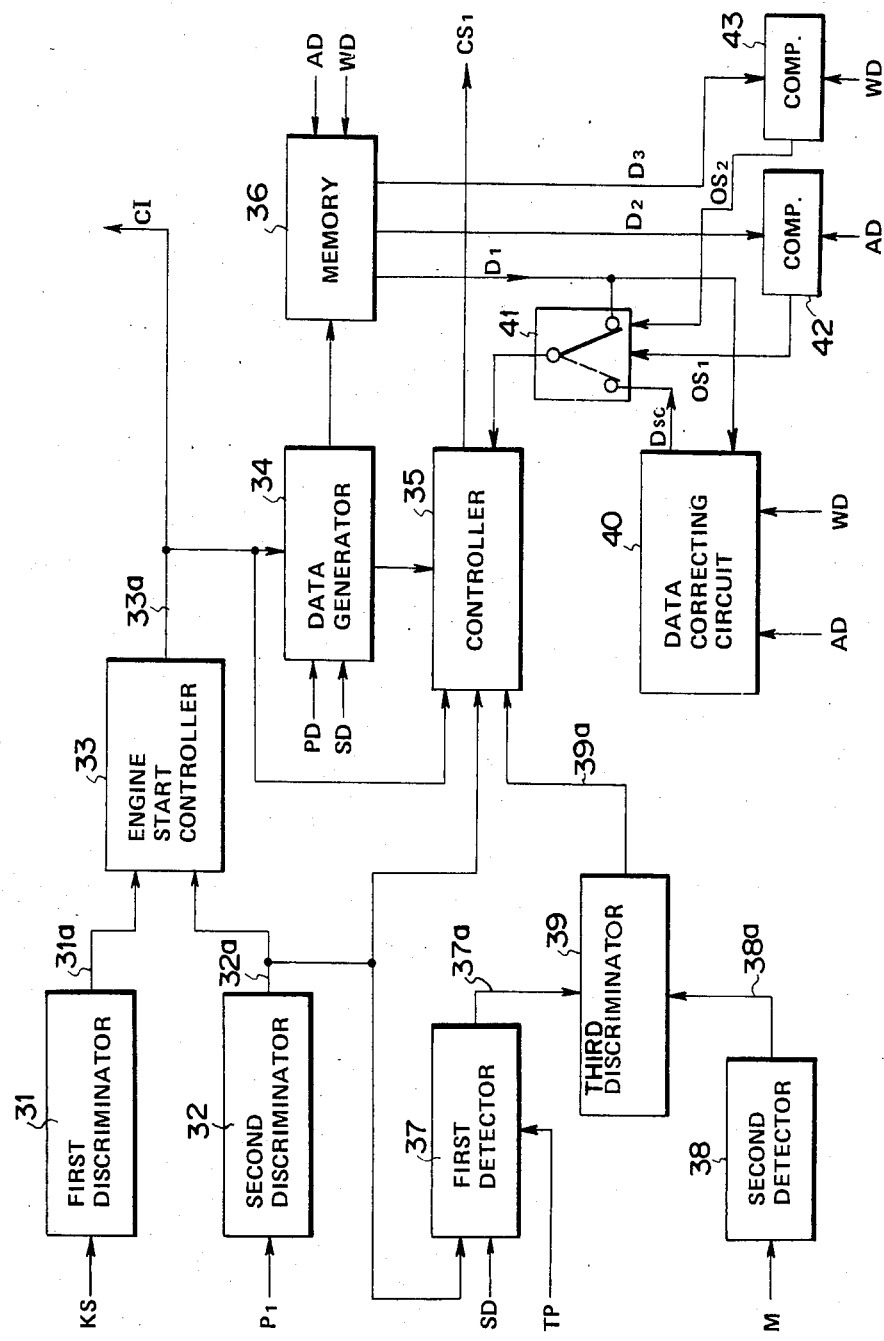
FIG. 3 is a detailed block diagram of the clutch control unit 14 of FIG. 1.

FIG. 3 shows a detailed block diagram of the clutch control unit 14. The clutch control unit 14 has a first discriminator 31 for discriminating whether or not the ignition switch $SW_1$ is switched over to its ON or ST position on the basis of the switch signal KS and the level of the output line $31_a$ of the first discriminator 31 becomes high only when the ignition switch $SW_1$ is switched over to its ON or ST position. A second discriminator 32 responsive to the first pulse train signal $P_1$ discriminates whether or not the engine speed N of the diesel engine device 2 is more than a predetermined value $N_0$, the value $N_0$ being a reference speed for detecting that starting of the engine has been completed. The engine idling speed may be selected as $N_0$. The output level of the output line $32_a$ of the second discriminator 32 becomes high only when the engine speed N is more than $N_0$.

The output signals from the first and second discriminator 31 and 32 are applied to an engine start controller 33 and the level of the output line $33_a$ becomes high when the level of the output line $31_a$ is high and the level of the output line $32_a$ is low, that is, when the ignition switch SW is in its ON or ST position and the engine speed N is not more than $N_0$.

The signal appearing on the output line $33_a$ is applied to the engine control unit 29 as a command for conducting the engine start operation.

The output line $33_a$ is also connected to a data generator 34 for detecting the semi-engaging zone of the friction clutch 4 and for producing data showing the semi-engaging zone. The data generator 34 is triggered by the level change of the output line $33_a$ from low to high and the computation necessary for determining the semi-engaging zone of the clutch 4 is carried out on the basis of the position signal PD and the slip signal SD by the data generator 34.

The output lines $32_a$ and $33_a$ are also connected to a controller 35 for producing the control signal $CS_1$ for controlling the actuator 7. In response to the level of the output lines $32_a$ and $33_a$, when the engine speed N becomes more than $N_0$ after the engine has been started the controller 35 produces the control signal $CS_1$ by which the release-lever 8 is operated in such a way that the driving disc 9 is moved from the position at which the clutch 4 is in a completely disengaged state to the position at which the clutch 4 is in a completely engaged state and then is returned to the position at which the clutch 4 is completely disengaged.

Figure 4:
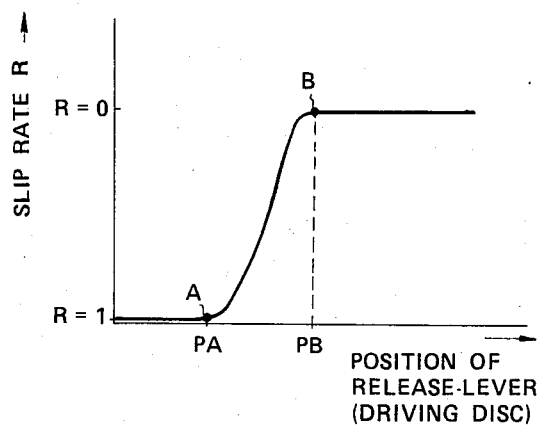
FIG. 4 is a characteristic curve showing the relationship between the position of a release-lever and the slip rate of a clutch.

In this case, the slip rate R of the clutch 4 changes as shown in FIG. 4 in accordance with the change in the position of the release-lever 8 or the driving disc 9. The data generator 34 detects the positions PA and PB corresponding to the points A and B on the characteristic curve shown in FIG. 4 and generates data $D_1$ showing the semi-engaging zone of the clutch 4 at this time from the above detected result. Data $D_1$ as initial data is stored in a memory 36 to which the inclination signal AD and the weight signal WD are applied. The contents of these signals AD and WD at the time of the storing of data $D_1$ are also stored in the memory 36 as data $D_2$ and $D_3$, respectively.

A first detector 37 receives the slip signal SD, the gear position signal TP and the output from the second discriminator 32 and determines whether the vehicle is still in the course of the vehicle starting operation for putting the vehicle in motion. Namely, in response to these input signals, the first detector 37 produces a high level signal on its output line $37_a$ only when the slip rate is not zero while the engine speed N is more than $N_0$ and the gear position of the transmission is other than neutral, that is, when the vehicle is still in the vehicle starting operation.

A second detector 38 is provided for detecting in response to the signal M whether or not the amount AC of depression of an accelerator pedal (not shown) is more than a predetermined value $AC_0$ and the output level of its output 25 line $38_a$ becomes high when $AC > AC_0$.

The output lines $37_a$ and $38_a$ are connected to a third discriminator 39 which discriminates whether or not the levels of the output lines $37_a$ and $38_a$ are high and the level of the output line $39_a$ of the third discriminator 39 becomes high when both input levels are high. That is, when $AC > AC_0$ and the vehicle is still in the vehicle starting operation, the level of the output line $39_a$ is high.

The output line $39_a$ is connected to the controller 35, which produces the control signal $CS_1$ by which the clutch 4 is engaged so as to start the vehicle in motion in response to the fact that the level of the output line $39_a$ has changed from low to high. Thus, the clutch control unit 14 operates the friction clutch 4 so as to put the vehicle in motion.

In order to provide the controller 35 with the exact data concerning the semi-engaging zone of the friction clutch 4 needed for carrying out the vehicle starting operation, there is provided a data correcting circuit 40 which receives the weight signal WD, the inclination signal AD and the data $D_1$ from the memory 36. In the data correcting circuit 40, the load of the vehicle at that time is calculated in accordance with the aforementioned equation on the basis of the signals WD and AD and other fixed data stored in the circuit 40, and the data $D_1$ is corrected on the basis of the calculated result concerning the load of the vehicle.

The calculations for correcting the data $D_1$ may be carried out by map calculation using the data $D_1$ and signals WD and AD. In this case, the signals WD and AD are changed into digital form, and data $D_1$ and the signals in digital form are applied to a digital memory in which a predetermined map of corrected values is stored, whereby the desired corrected data Dsc can be obtained.

Data Dsc and $D_1$ are applied to a switch 41 for selecting either data Dsc or $D_1$, and the data selected by the switch 41 is applied to the controller 35 as data showing the semi-engaging zone of the friction clutch 4.

Data $D_2$ and $D_3$ from the memory 36 are applied to comparators 42 and 43, respectively, to which the inclination signal AD and the weight signal WD are also applied, respectively. The comparator 42 compares data $D_2$ with the inclination signal AD and the level of the output signal $OS_1$ of the comparator 42 becomes high only when the difference between the inclination shown by the data $D_2$ and the inclination shown by the inclination signal AD at that time is more than a predetermined value.

Similarly, the comparator 43 compares data $D_3$ with the weight signal WD and the level of the output signal $OS_2$ of the comparator 43 becomes high only when the difference between the load weight shown by the data $D_3$ and the load weight shown by the weight signal WD at that time is more than a predetermined value. The output signals $OS_1$ and $CS_2$ are applied to the switch 41 as switch control signals. The switch 41 is switched over as shown by the solid line when the levels of the output signals $OS_1$ and $OS_2$ are both low, while the switch 41 is switched over as shown by the broken line when the level of at least one of the output signals $OS_1$ and $OS_2$ is high.

That is, when the load condition determined by the weight signal WD and the inclination signal AD is substantially equal to the initial condition at the time the data $D_1$ was determined, data $D_1$ is selected by the switch 41 and is supplied to controller 35. On the other hand, when the load condition has changed, the corrected data Dsc is selected and supplied to the controller 35.

Figure 5:
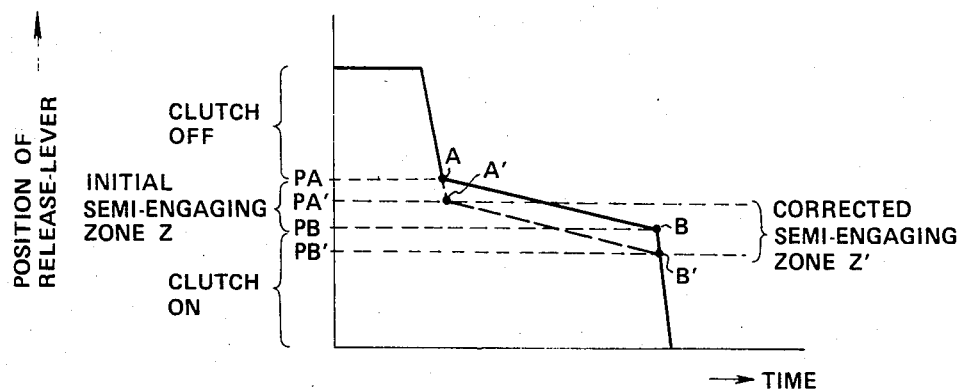
FIG. 5 is a characteristic curve relating to the engaging/disengaging operation of a clutch.

Thus, the controller 35 produces the control signal $CS_1$ for driving the actuator 7 on the basis of the data selected by the switch 41, which shows the semi-engaging zone corresponding to the load condition of the vehicle at each instant, and the engaging operation of the friction clutch 4 is carried out in accordance with the characteristic as shown in FIG. 5. In this case, the slip rate R in the semi-engaging zone is appropriately controlled, whereby the described clutch control characteristic for the semi-engaging operation can be realized.

For the use of the data $D_1$, the semi-engaging zone of the friction clutch 4 is defined by the points A and B. Therefore, the engaging operation of the clutch 4 is carried out at relatively low speed in the semi-engaging zone Z between the position PA and PB of the release-lever 8, while the engaging speed is relatively high in the zone other than the semi-engaging zone Z.

For the use of the data Dsc, the semi-engaging zone of the friction clutch 4 is defined by the points A' and B'. Therefore, the low engaging speed is selected for this corrected semi-engaging zone Z' which is between the positions PA' and PB' of the release-lever 8.

As described above, since the initial data $D_1$ is corrected in accordance with the load condition of the vehicle at each instant, it is always possible to provide an optimum semi-engaging zone corresponding to the load of the vehicle at each instant. Consequently, smooth starting of the vehicle can be assured regardless of the load condition of the vehicle.

In the embodiment described above, although the load of the vehicle at each instant is detected by the use of the load weight detector 15 and the inclination detector 16, it is possible to use only one or the other of the load weight detector 15 or the inclination detector 16.

Furthermore, other suitable load detectors can also be employed.

Figure 6:
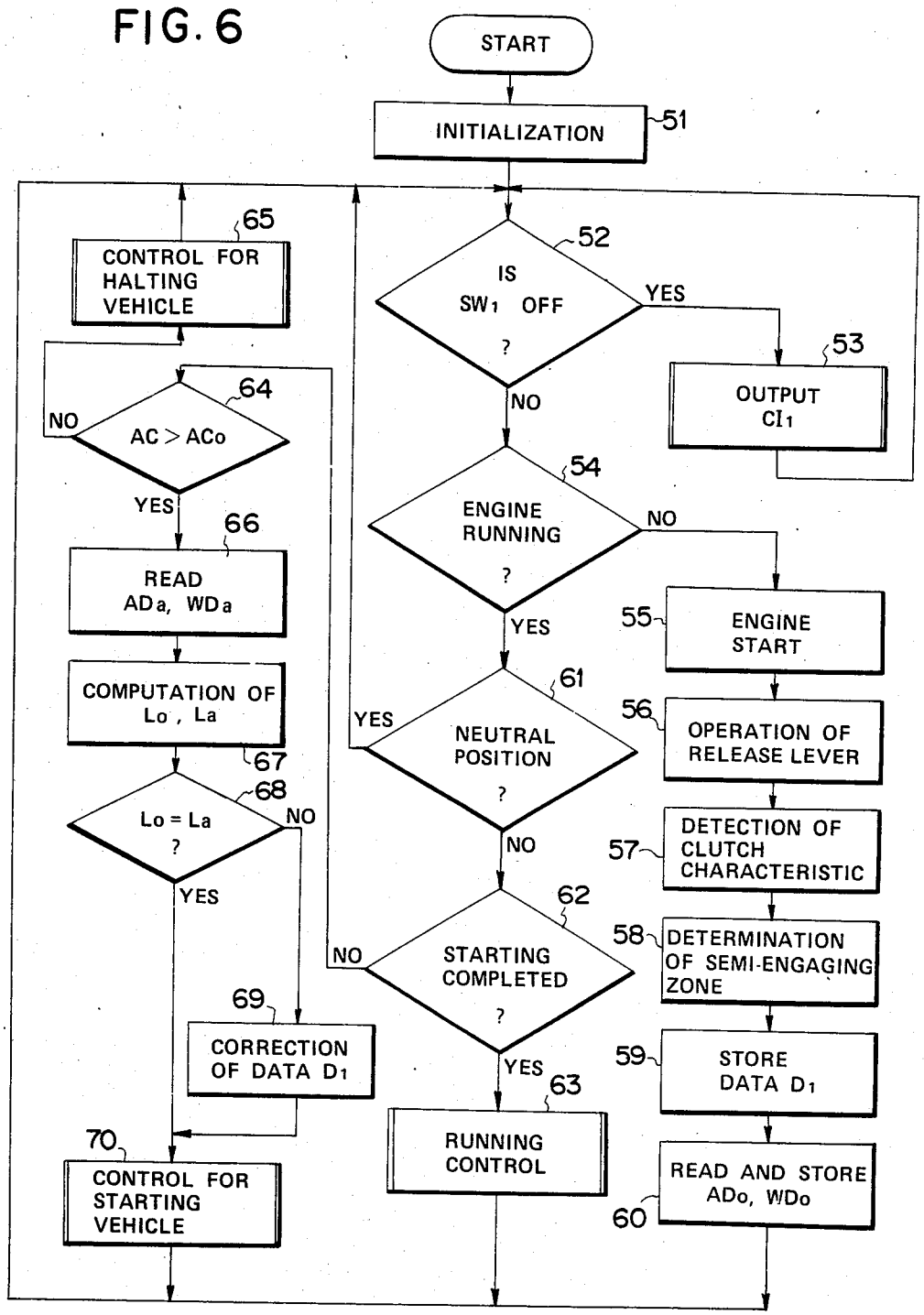
FIG. 6 is a flow chart showing a control program executed in a microcomputer for obtaining a control function similar to that of the clutch control unit shown in FIG. 3.

The control function of the clutch control unit 14 shown in FIG. 3 can be realized by the execution of a predetermined control program in a microcomputer. The flow chart of one example of such a control program is shown in FIG. 6.

This flow chart will now be explained. After the start of the execution of the control program, the control program is initialized in step 51 and the operation moves to step 52 in which discrimination is made on the basis of the switch signal KS as to whether the ignition switch $SW_1$ is switched to its OFF position. The operation moves to step 53 when the decision in step 52 is YES, and the operation returns to step 52 after a signal $CI_1$ for stopping the diesel engine device 2 is supplied to the engine control unit 29. On the other hand, when the decision in step 52 is NO, that is, when the ignition switch $SW_1$ is switched over to its ON or ST position, the operation moves to step 54, in which a decision is made on the basis of the first pulse train signal $P_1$ as to whether the diesel engine device 2 is running. When the diesel engine device 2 is not running, a signal $CI_2$ for starting the diesel engine is produced in step 55 and is sent to the engine control unit 29.

Then, the learning operation for detecting the semi-engaging zone of the friction clutch 4 is executed. At first, the actuator 7 is driven by the control signal $CS_1$ in such a way that the release-lever 8 is moved in the direction for engaging the clutch 4 at a predetermined speed (step 56). During the operation of the release-lever 8 as described above, the relationship between the position of the release lever 8 and the slip rate R, i.e. a characteristic curve like that shown in FIG. 4, is determined on the basis of the position signal PD and the slip signal SD applied to the clutch control unit 14 (step 57). Thus, the semi-engaging zone at that time is decided in accordance with the detected characteristic curve in a similar way to that in FIG. 3 (step 58). Data $D_1$ showing the semi-engaging zone decided as described above is stored in step 59 and the values $AD_1$ and $WD_0$ corresponding to the inclination signal AD and the weight signal WD at this time are also stored in the memory. Then, the operation returns to step 52.

When the decision in step 54 is YES, the operation moves to step 61 in which the decision is made as to whether the transmission is in neutral. When the decision in step 61 is YES, the operation returns to step 52. On the other hand, when the decision in step 61 is NO, a decision is made as to whether the operation of starting the vehicle into motion has been completed in step 62. When the result of the decision in step 62 is YES, the operation moves to step 52 after the control operation for the running of the vehicle is executed by the engine control unit 29 (step 63).

When the decision in step 62 is NO, the operation moves to step 69 in which a decision is made as to whether the amount AC of the operation of the accelerator pedal (not shown) is more than the predetermined value $AC_0$ on the basis of the data M applied to the clutch control unit 14. When $AC \leq AC_0$, control operation for halting the running of the vehicle is carried out in step 65.

When $AC > AC_0$, the operation moves to step 66 in which the values $AD_a$ and $WD_a$ of the inclination signal AD and the weight signal WD are read in. Then, in step 67, the vehicle load $L_0$ at the time data $D_1$ was obtained is calculated on the basis of the values $AD_0$ and $WD_0$, and the vehicle load $L_a$ at the time values $AD_a$ and $WD_a$ were obtained is calculated on the basis of these values $AD_a$ and $WD_a$. After this, a decision is made in step 68 as to whether the load $L_0$ is equal to the load $L_a$. When $L_0 = L_a$, the operation moves to step 70 without any correction of data $D_1$. When the load $L_a$ is not equal to the load$_0$, the operation moves to step 69 in which the data $D_1$ is corrected in accordance with the load $L_a$ to produce the corrected data Dsc. The operation moves to step 70 after the data correction in step 69.

Step 70 is a control step for starting the truck into motion by engaging the clutch 4, and the actuator 7 is driven on the basis of data concerning the semi-engaging zone of the clutch 4 corresponding to the state of the vehicle load at each instant, so that the friction clutch 4 is operated to connect in accordance with the characteristics as shown in FIG. 5.

We claim:

1. A vehicle clutch control apparatus having an actuator for operating a friction clutch for a vehicle and a controlling means for controlling the actuator, in which a first data representing a semi-engaging zone of said friction clutch is obtained in accordance with a command from said controlling means just after the engine is started and before the vehicle is driven to move, and at least the engaging operation of the clutch is carried out with reference to the first data, said apparatus comprising:
a first means including a weight detector for producing a weight signal indicating the weight of the vehicle and its load and an inclination detector for producing an inclination signal indicating the degree of inclination of the vehicle, said first means producing a second data relating to the magnitude of the load of the vehicle on the basis of the weight signal and the inclination signal; and
a second means for correcting the first data in accordance with the second data so that the corrected first data indicates a corrected semi-engaging zone in accordance with the vehicle load.

2. An apparatus as claimed in claim 1 further comprises a detecting means for detecting whether or not the starting operation for putting the vehicle into motion has begun, the second data being produced in response to the detection by said detecting means before every operation for putting the vehicle in motion is carried out.

3. An apparatus as claimed in claim 2 further comprising a difference detecting means for detecting whether the difference between the vehicle load indicated by the second data at each instant and that at the time of the first data was obtained is within a predetermined range, and the first data is corrected by the second data in response to the detection by said difference detecting means.

4. An apparatus as claimed in claim 1 further comprising a difference detecting means for detecting whether a difference between the vehicle load indicated by the second data at a particular instant and that indicated at the time the first data was obtained is within a predetermined range, and the first data is corrected in accordance with the second data in response to the detection of a difference outside said predetermined range by said difference detecting means.

5. An apparatus as claimed in claim 4 wherein said difference detecting means has a memory for storing the second data at the time the first data was obtained and a comparing means for comparing the second data at each instant with the second data stored in said memory.

6. An apparatus as claimed in claim 5 wherein said second data is produced every time the operation for putting the vehicle in motion is carried out.

7. An apparatus as claimed in claim 1 wherein said first means has a calculating means responsive to at least the weight signal and the inclination signal for calculating the second data.

8. An apparatus as claimed in claim 7 further comprising a memory for storing the values of the weight signal and the inclination signal at the time the first data was obtained, a first comparator for comparing the weight load indicated by the weight signal stored in said memory with that indicated by the weight signal at that time and a second comparator for comparing the inclination degree indicated by the inclination signal stored in said memory with that indicated by the inclination signal at that time, whereby the first data is corrected by the second data when the output conditions of said first and second comparators assume a predetermined state.

9. An apparatus as claimed in claim 8 wherein said second means is responsive to the first data, the weight signal and the inclination signal and produces corrected data indicating a corrected semi-engaging zone corresponding to the vehicle load at each instant.

* * * * *